United States Patent [19]
Secosky

[11] Patent Number: 5,581,985
[45] Date of Patent: Dec. 10, 1996

[54] SAFETY CLUTCHES FOR SELF POWER OPERATED LAWN MOWERS

[76] Inventor: Paul M. Secosky, P.O. Box 491, Hopwood, Pa. 15445

[21] Appl. No.: 490,834

[22] Filed: Jun. 15, 1995

[51] Int. Cl.⁶ ..................................... A01D 34/76
[52] U.S. Cl. ............... 56/10.3; 56/11.3; 56/11.8; 56/DIG. 6
[58] Field of Search .................. 56/10.3, 10.4, 56/11.3, 11.7, 11.8, 16.7, DIG. 6

[56] References Cited

U.S. PATENT DOCUMENTS

| | | | |
|---|---|---|---|
| 3,050,923 | 8/1962 | Sanderson | 56/10.3 |
| 4,593,800 | 6/1986 | Ness et al. | 192/30 W X |
| 4,924,988 | 5/1990 | Page | 56/11.3 |
| 5,033,595 | 7/1991 | Pardee | 56/11.3 |

*Primary Examiner*—Terry Lee Melius
*Attorney, Agent, or Firm*—Robert Halper

[57] ABSTRACT

A safety clutch for a power operated lawn mower requiring a minimum of parts and readily adaptable to exisitng mowers having a clutch with detents that are biased against a driven member bolted to a mower blade for normal operation, wherein the clutch becomes disengaged from the driven member and blade in case of overload, while the engine shaft continues to rotate. There are no levers necessary to control either engagement or disengagement of the clutch.

4 Claims, 2 Drawing Sheets

5,581,985

SAFETY CLUTCHES FOR SELF POWER OPERATED LAWN MOWERS

FIELD OF INVENTION

This invention relates to safety clutches for lawn mowers which are connected to a mower blade in such a way that the blade will cease to revolve in the event that an obstruction is encountered.

BACKGROUND OF INVENTION

U.S. Pat. No. 2,497,893 shows a synchronized and adjustable safety clutch having a driven shaft and a driving shaft. If an overload is imposed on the driven shaft or an obstruction encountered by the machine, pin 15 is forced out of its cavity 8 thus forcing the movable clutch member 9 backward against springs 11 and stopping the machine. If this occurs the safety pin 22 will be forced into its recess 22 on shaft 2 thereby locking the clutch member in retracted position.

U.S. Pat. No. 3,282,387 teaches an overload clutch of the detent type. A motor has a driving plate secured to the shaft. The driving plate is bolted to a detent carrying plate. A driven plate is secured in the driving plate along with a wear plate. A detent or plunger is heldin the carrying plate and is urged by a spring towards the wear plate. The detent is at+ached to a detector plate. When there is overload, the detent urges the detector plate o contact another plunger which activates a microswitch to shut off the motor, and thus disengage the clutch.

U.S. Pat. No. 4,117,652 teaches a transmission for self propelled walking lawn mowers. A lever is grasped and pulled by an operator of the mower. This action pulls on a cable to move another lever in a clockwise direction. The shifter fork is then moved to the right to cause the clutch dog to engage the worm wheel. When the manually operated lever is released by the operator a spring returns the shifter dog to the left and disengages the power wheels from the engine,.

U.S. Pat. No. 4,205,509 teaches a power transmission device for a power operated lawn mowing machine. A rotational shaft for a motor and a rotational shaft for a cutting blade are interlocked with a friction clutch. These clutches become engaged and disengaged, by a manually operated lever. A disc brake also applies braking action to the cutting blade at the time of clutch disengagement U.S. Pat. No. 4,466,233 shows a mower drive assembly for selectively coupling an engine drive shaft to rotatably drive a mower blade by grasping a control lever or halting the blade when the control lever is released while the engine is running. The drive assembly includes a drive member secured to the end of a drive shaft and supporting an annular driven member to which the mower blade is connected. A clutch ring is coupled for rotation with the driven member by intermeshing sets of teeth movable axially relative to each other to accommodate spring biased axial clutch ring displacement with a brake pad to halt driven member rotation. An activator yoke responsive to control lever retraction displaces the clutch ring from the the pad and into engagement with the driven member for rotation thereof.

U.S. Pat. No. 4,593,800 is directed to a clutch mechanism that can have its bias changed so that it is independent of the torque applied to the clutch. A drive ,shaft is connected to a driving element. A driven element is connected to the driving element through bearings. Bores in the driving shaft contain a set screw to adjust the bias of a spring connected to a moving element. Hemispherical indentations in the driven element receive the moving member. When the torque on a driving member exceeds its limit, the movable members is compressed and activates a warning pin whereupon another movable member is engaged to drive the driven element. If the torque on the driving element is increased to excess both movable members become disengaged Then the pin signals overload and the driven element is stopped from operating.

U.S. Pat. No. 4,746,320 teaches a torque limiting clutch having a driving member and a driven member. The driving member has slots for accommodating a series of ball detents with spring and adjustable nut biasing against the detents forcing them into a seating relationship on bearing seats provided on a rotatable member integral with a driven member. Various races are biased against the ball detents to insure distribution of uniform pressure and provide freedom for shifting of the detents as they are unseated during clutch disconnection. A displacement plate connected to the races is shiftable when the clutch disconnects to actuate a microswitch for shutting off operations when excess torque has been encountered.

The art teaches that there are a number of overload clutches of the detent type. Some clutches use ball type detents and some have an adjustable feature using screws. When an overload occurs the clutches are designed to disengage and activate a switch so that the entire assembly ceases operation. In the case of some lawnmowers the clutch becomes disengaged so that the blade ceases to rotate while the motor continues to run; however, it is necessary that an operator manually grasp a control lever to control the sequence of events. Furthermore, a brakepad is also required to brake the blade at the time of clutch disengagement.

It is an object of this invention to produce a safety device for a walking motor driven lawnmower which is simple in design and relatively inexpensive.

It is a further object of this invention to design a safety clutch for a motor driven lawnmower which requires no control lever requiring an operator to inactivate the blade while the motor continues to run.

It is still an object of this invention to produce a safety clutch for a power operated lawn mower wherein the mower blade becomes reoperable once overload has been overcome without restarting the motor.

It is an additional object of this invention to adapt a safety clutch for a manually operated lawn mower that requires no additional accessories such as a brake to halt the blade once the clutch has been disengaged.

SUMMARY OF THE INVENTION

The safety clutch of this invention has a minimal number of parts. The clutch is attached to the main engine shaft ithrough a bolt located in the center of the blade. The blade is bolted to a driven plate located below the clutch. A fixed bearing is mounted in the center of the driven plate, When an obstacle is encountered such that there is greater torque than that for which the clutch is designed to handle, the clutch through its detents would be urged toward the springs. Consequently the driven plate and its underlying blade would cease to operate, while the engine shaft would continue running on the fixed bearing. Once the overload would be overcome, the detents would again make contact with the driven plate and the attached blade and the blade would rotate once more.

DETAILED DESCRIPTION OF THE INVENTION

Figure 1:
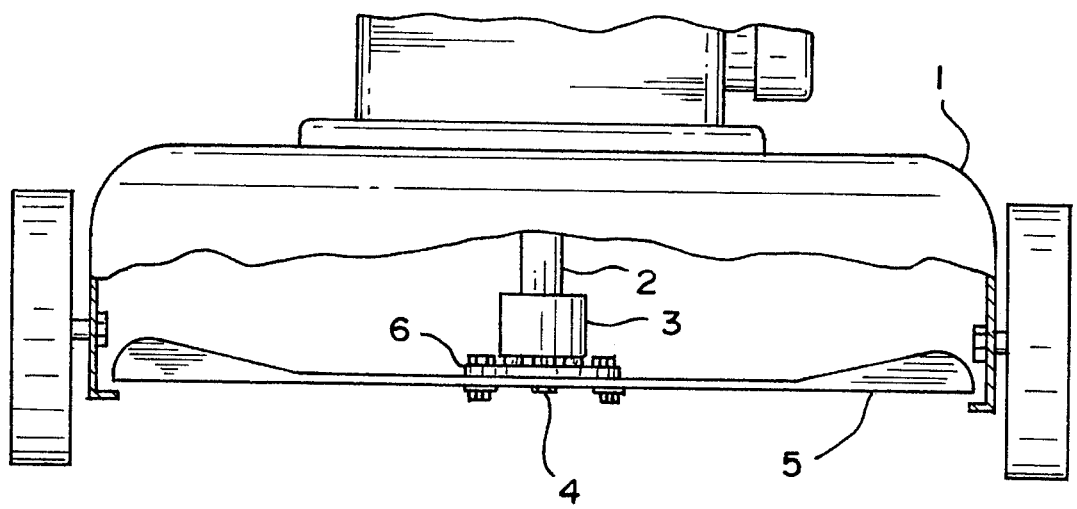
FIG. 1 is a front view of the lawn mower.
Figure 4:
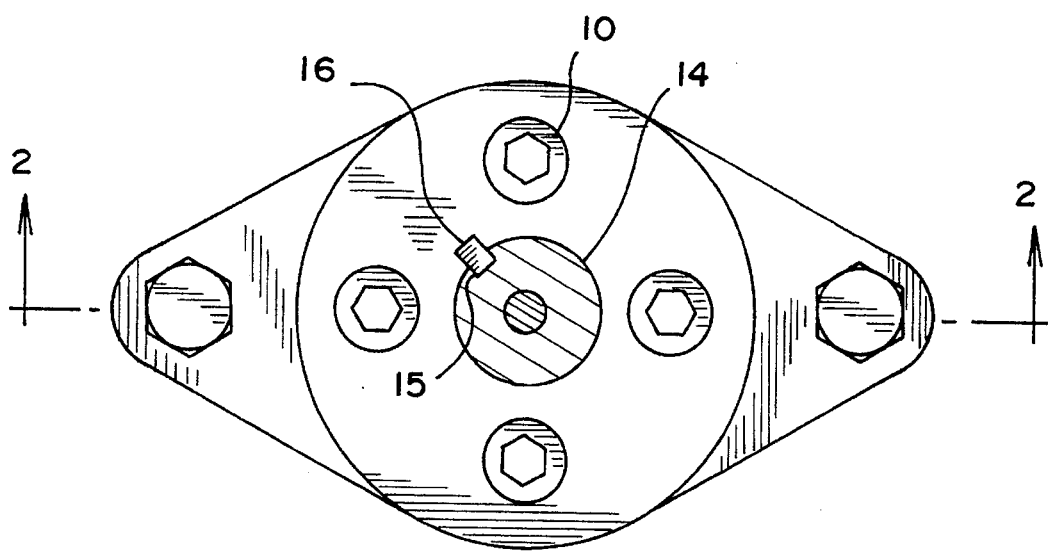
FIG. 4 is a plan view taken on line 4—4 of FIG.2.
Figure 2:
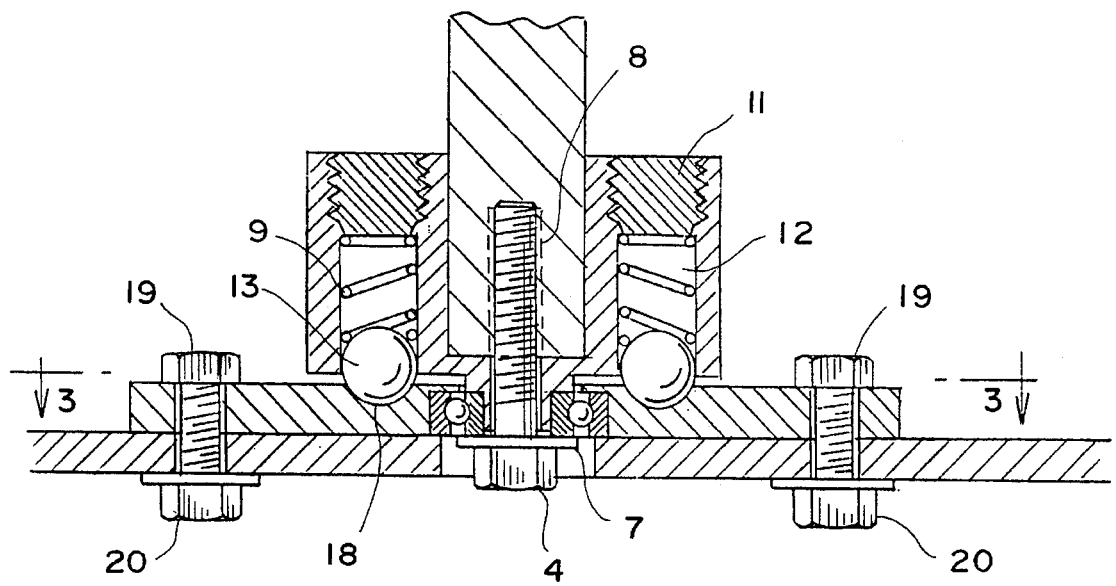
FIG. 2 is a front cross section taken on line 2—2 of FIG. 1.
Figure 3:
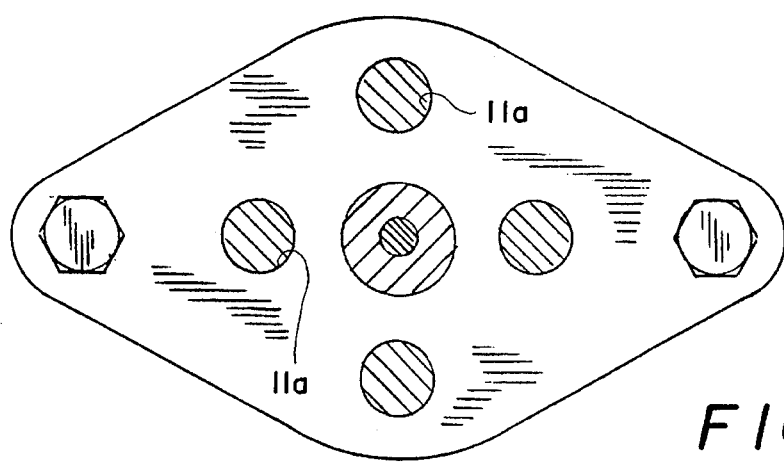
FIG. 3 is a plan view taken on line 3—3 of FIG. 2.
Figure 5:
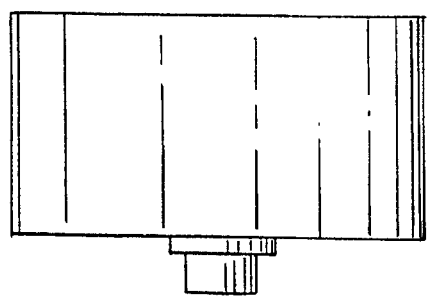
FIG. 5 is front cross section absent the blade and engine shaft.

FIG. 1 shows a lawn mower 1 having an engine shaft 2, a clutch housing 3, a bolt 4 extending upwardly through a mower blade 5 and a driven plate 6. FIG. 2 shows the details of the clutch housing which include the bolt and a washer 7 with the bolt passing through a bore 8 that extends through the clutch housing and the engine shaft and attaches the clutch housing to the shaft, the bore and the bolt being threadably engaged only in the shaft. A clutch 9 within the housing includes four circular openings 10 each spaced symmetrically about the engine shaft Within the opening starting at the top surface is an adjusting screw 11 followed by a compressible spring 12 and a movable element or detent 13 in the form of a steel ball. The top surface of the housing is planar and has an aperture 14 in its center for insertion of the engine shaft and a groove 15 for a key 16 protruding from the shaft. The securement of the key in the groove helps stabilize the shaft on rotation. As best seen in FIG. 5 the bottom surface of the housing is stepped. Extending from the inner circumferential edge of opening 10 and slightly above the driven plate there is a horizontal step followed by a smaller vertical segment, a second smaller step, a longer vertical segment 17 that surrounds the bolt. The steel ball fits into a hemispherical surface 18 of the driven member 6. As seen in the plan view there are four screws which are used to adjust the bias and thus control the amount of torque which is permissible. The heads of the screws have hexagonal recesses 11a to accommodate an Allen wrench. Bolts 19 passing upwardly through the mower blade and washers of the same size as described above secure the mower blade to the driven plate with nuts 20. The driven plate is formed of two conical elements joined at their respective bases and rounded at their apices. This plate is fixed around vertical segment 17 through bearings 21 and the inner periphery of the plate ends as a flange 22 that overlies the outer race of the bearing. The blade has a centrally located hole 23 through which the belt 4 passes. Both washer and bolt are pressed firmly against the inner race of the bearing so that the driven plate bolted to the blade rotates about the shaft.

In operation when power is distributed to the shaft through the prime mover, the ball detents will be pressed down into the driven plate so that the plate and its accompanying blade will be rotated. If a load is encountered that exceeds the allowable torque, the bails will be forced upward against the spring which will disengage the driven plate and the blade while the engine shaft and clutch will continue to rotate. Once the obstacle is removed or passed over, the ball detents will revert to their normal position and the lawn mowing operation can continue. The clearance between the bottom of the clutch housing and the driven plate prevents binding at the time of disengagement.

The assembly of the clutch housing is simple and consists of the following steps 1. Remove the rotating blade from the shaft by removing the center bolt 2. Place the safety clutch over the shaft and reattach the bolt.

3. Adjust the screws to obtain the desired torque.

These instructions pertain to the complete assembly as described. However, the concept could readily be adapted to all makes and models now in existence.

Various modifications of the above described embodiment will be obvious to one skilled in the art and it is to be understood that such modification can be made without departing from the scope of the invention as described by the appended claims.

I claim:

1. A power operated lawn mower having a prime mover which comprises (a) a rotating blade and means fastening said blade to a driven member, said driven member being mounted about fixed bearings, (b) an upright bolt extending upwardly from a centrally located hole in said blade and passing through a bore for fastening a clutch housing to a shaft, said shaft having a key that meshes with a groove in said clutch housing, said bore and said bolt being threaded only in the region of said shaft, (c) said clutch housing having a planar top surface, a stepped down surface including a vertical segment that surrounds said bolt, said driven member being fixed to said vertical segment of said clutch housing by said bearings and a clutch having four cylindrical openings spaced circumferentially about said shaft, each said opening containing a steel ball detent adjacent said driven member, followed by a spring and an adjusting screw extending to said top surface, (d) said detent seating in an indentation in said driven plate member to engage said clutch for normal operation of said lawn mower.

2. A lawn mower as in claim 1 wherein said means for fastening said blade to said driven member is a pair of bolts and corresponding nuts located near the periphery of said driven member, said member being formed by two conical elements joined at their respective bases and being rounded at their apices.

3. A lawn mower as in claim 1 wherein said adjusting screw biases the spring to control the amount of torque permissible under load and wherein said detent is pressed upwardly against said spring if an overload is encountered, said driven member and said blade becoming inoperable while said shaft and said clutch continue to rotate.

4. A mower as in claim 1 wherein said detents seat in hemispherical surfaces in said driven member and said upright bolt includes a head and a washer that are pressed against an inner race of said bearing.

* * * * *